(12) United States Patent
Ugrin et al.

(10) Patent No.: US 11,377,039 B2
(45) Date of Patent: Jul. 5, 2022

(54) SYSTEMS AND METHODS TO HOLD AND CHARGE A PERSONAL ELECTRONIC DEVICE ON A RIDE VEHICLE

(71) Applicant: Universal City Studios LLC, Universal City, CA (US)

(72) Inventors: John Charles Ugrin, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 153 days.

(21) Appl. No.: 16/682,206

(22) Filed: Nov. 13, 2019

(65) Prior Publication Data

US 2021/0138965 A1 May 13, 2021

(51) Int. Cl.
| | |
|---|---|
| *B60R 7/04* | (2006.01) |
| *B60R 11/02* | (2006.01) |
| *H02J 7/00* | (2006.01) |
| *A63G 7/00* | (2006.01) |
| *A63G 31/00* | (2006.01) |
| *B60R 11/00* | (2006.01) |

(52) U.S. Cl.
CPC .......... *B60R 7/043* (2013.01); *B60R 11/0241* (2013.01); *H02J 7/0027* (2013.01); *A63G 7/00* (2013.01); *A63G 31/00* (2013.01); *B60R 2011/0075* (2013.01)

(58) Field of Classification Search
CPC ................. B60R 11/02; B60R 11/0241; B60R 2011/008; B60R 2011/0075; A63G 31/00; A63G 7/00; H02J 7/0044

USPC ................................. 224/245, 929, 930, 570
See application file for complete search history.

(56) References Cited

U.S. PATENT DOCUMENTS

| | | | | |
|---|---|---|---|---|
| 4,779,777 A | * | 10/1988 | Johnson | ..................... A45F 5/02 224/250 |
| 6,208,734 B1 | * | 3/2001 | Ortscheid | ........... B60R 11/0241 379/446 |
| 6,491,194 B2 | * | 12/2002 | Marvin | ............... B60R 11/0241 224/247 |
| 6,554,437 B2 | * | 4/2003 | von Glasow | ....... B60R 11/0241 359/872 |
| 7,788,215 B2 | | 8/2010 | Trowbridge et al. | |
| 8,128,046 B1 | * | 3/2012 | Howard, Jr. | ............... A45F 5/02 248/313 |

(Continued)

FOREIGN PATENT DOCUMENTS

WO    2018217661 A1    11/2018

OTHER PUBLICATIONS

PCT/US2020/057555 International Search Report and Written Opinion dated Feb. 10, 2021.

(Continued)

*Primary Examiner* — Justin M Larson
(74) *Attorney, Agent, or Firm* — Fletcher Yoder, P.C.

(57) ABSTRACT

Present systems and methods are directed to a ride system that includes a personal electronic device (PED) holding system for a ride vehicle. The PED holding system includes a lock that is configured to move from an unlocked configuration to a locked configuration to lock a PED of a passenger of the ride vehicle to the ride vehicle during a ride cycle. The PED holding system also includes a charging system that is configured to charge an energy storage component of the PED during the ride cycle.

19 Claims, 5 Drawing Sheets

(56) References Cited

U.S. PATENT DOCUMENTS

| | | | | |
|---|---|---|---|---|
| 8,646,825 | B2* | 2/2014 | Minelli | B60R 11/02 296/37.7 |
| 8,672,199 | B1* | 3/2014 | Ditore | B62B 3/1424 224/411 |
| 8,816,636 | B2* | 8/2014 | Shinde | B60R 11/0235 320/108 |
| 8,998,049 | B1* | 4/2015 | Orr | B60R 11/02 224/483 |
| 9,084,004 | B2* | 7/2015 | Rawlinson | B60K 35/00 |
| 9,096,177 | B2* | 8/2015 | Boundy | B60R 7/04 |
| 9,386,335 | B2* | 7/2016 | Rawlinson | H04N 21/42201 |
| 9,545,146 | B1 | 1/2017 | King | |
| 9,648,374 | B2* | 5/2017 | Rawlinson | G06F 3/1454 |
| 9,819,788 | B2 | 11/2017 | Dugoni | |
| 10,181,746 | B2 | 1/2019 | Kramer et al. | |
| 10,284,250 | B2* | 5/2019 | Andrus | G06F 1/1632 |
| 10,306,443 | B2* | 5/2019 | Rivera | H04W 12/06 |
| 10,336,277 | B2* | 7/2019 | Kubiak | B60R 21/055 |
| 10,340,712 | B2* | 7/2019 | Hobson | H02J 7/0044 |
| 10,460,539 | B2* | 10/2019 | Zielkowski | A45C 13/20 |
| 10,750,789 | B2* | 8/2020 | Memari | H02J 50/10 |
| 10,780,812 | B2* | 9/2020 | Filipovich | B60N 3/108 |
| 2004/0213405 | A1* | 10/2004 | Wilcox | H04M 1/04 379/455 |
| 2013/0083007 | A1* | 4/2013 | Geisner | G02B 27/017 345/419 |
| 2013/0222583 | A1* | 8/2013 | Earnshaw | H04N 21/47202 348/143 |
| 2014/0248923 | A1* | 9/2014 | Tomasini | H04M 1/04 455/557 |
| 2015/0157116 | A1 | 6/2015 | Williams | |
| 2015/0245666 | A1* | 9/2015 | Memari | A24F 40/48 131/329 |
| 2015/0371030 | A1* | 12/2015 | Rivera | G06F 21/44 726/19 |
| 2016/0062117 | A1* | 3/2016 | Imasaka | G02B 27/0149 345/7 |
| 2016/0325187 | A1 | 11/2016 | Schwartz et al. | |
| 2017/0127810 | A1 | 5/2017 | King | |
| 2017/0252658 | A1 | 9/2017 | Reveley | |
| 2018/0061157 | A1 | 3/2018 | Zielkowski et al. | |
| 2018/0253141 | A1 | 9/2018 | McCracken | |
| 2018/0339672 | A1 | 11/2018 | Kubiak et al. | |
| 2018/0345875 | A1* | 12/2018 | Buchhalter | F16M 11/041 |
| 2019/0217788 | A1* | 7/2019 | Buchhalter | F16M 13/00 |
| 2020/0008489 | A1* | 1/2020 | Memari | H02J 7/0042 |
| 2021/0045449 | A1* | 2/2021 | Memari | H02J 7/0042 |
| 2021/0119457 | A1* | 4/2021 | Kawaki | H02J 7/0044 |
| 2021/0138965 | A1* | 5/2021 | Ugrin | B60R 11/0241 |

OTHER PUBLICATIONS

Rizzo, Cailey; "The Walking Dead'Roller Coaster Will Use Your Screams to Charge Your Cell Phone", Website: https://www.travelandleisure.com/attractions/amusement-parks/screams-charge-phone-on-walking-dead-coaster, Mar. 28, 2018, pp. 1-2.

* cited by examiner

SYSTEMS AND METHODS TO HOLD AND CHARGE A PERSONAL ELECTRONIC DEVICE ON A RIDE VEHICLE

BACKGROUND

The present disclosure relates generally to amusement parks.

Many amusement parks include rides in which a ride vehicle carries one or more passengers along a ride path. The ride vehicle may change speed and/or direction as the ride vehicle travels along the ride path. The ride path may include a number of features, such as tunnels, turns, loops, and so forth. Various show effects on the ride vehicle and/or in an environment surrounding the ride vehicle may be provided to enhance the experience for the one or more passengers.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with one embodiment, a ride system includes a personal electronic device (PED) holding system for a ride vehicle. The PED holding system includes a lock that is configured to move from an unlocked configuration to a locked configuration to lock a PED of a passenger of the ride vehicle to the ride vehicle during a ride cycle. The PED holding system also includes a charging system that is configured to charge an energy storage component of the PED during the ride cycle.

In accordance with one embodiment, a PED holding system for a ride vehicle includes a container that is configured to contain a PED of a passenger of the ride vehicle during a ride cycle. The container enables the passenger to access a camera function of the PED during the ride cycle. The PED holding system also includes a charging system that is configured to charge an energy storage component of the PED while the PED is contained within the container during the ride cycle.

In accordance with one embodiment, a method of operating a PED holding system includes charging an energy storage component of a PED using a charging system of the PED holding system in response to the PED being locked to the ride vehicle via a lock.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
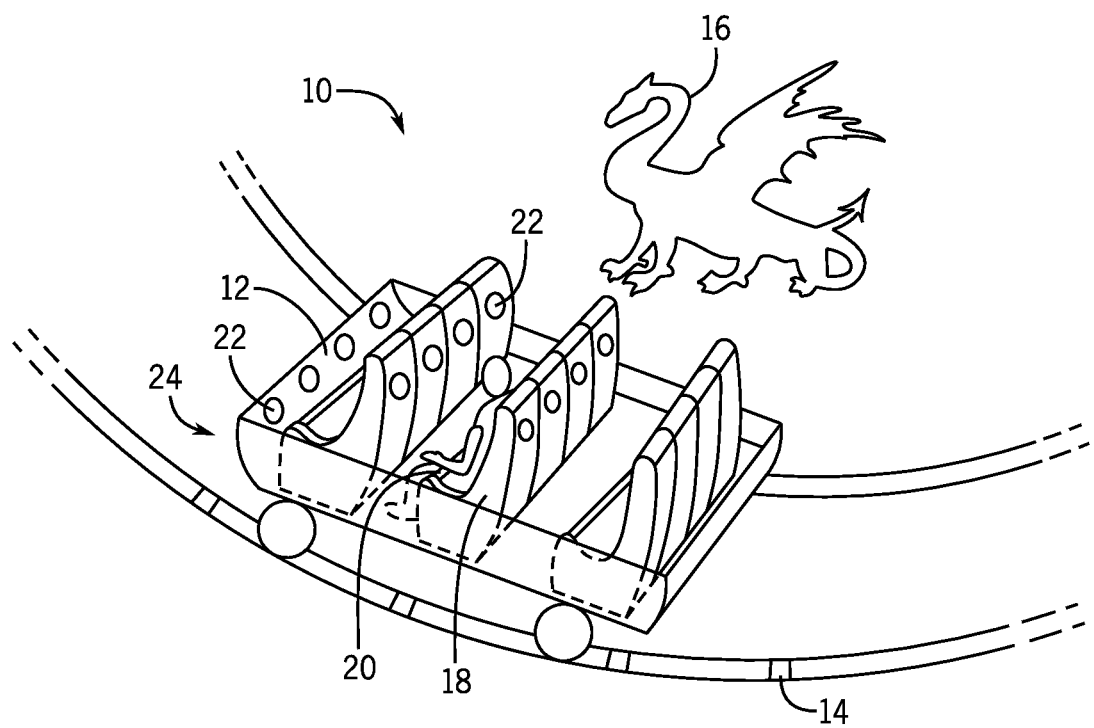
FIG. 1 is a perspective view of a ride system that may be used in an amusement park, in accordance an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The systems and methods disclosed herein relate generally to a personal electronic device (PED) holding system for a ride system within an amusement park. The ride system may include any type of attraction or experience that is designed to entertain a passenger, such as an attraction that includes a ride vehicle that travels along a path, an attraction that includes a ride vehicle that moves without traveling along a path, an attraction that includes a room or theatre with stationary or moving seats for passengers to sit in while the passengers watch a video, or the like. The PED holding system may include features that hold (e.g., contain, secure) a PED of a passenger of the ride vehicle during a ride cycle (e.g., during at least a portion of the ride cycle; between loading and unloading). The PED holding system may also include features that charge an energy storage component (e.g., battery) of the PED during the ride cycle. Additionally or alternatively, the PED holding system may include features that enable the passenger to access certain features, such as a camera, of the PED during the ride cycle. Additionally or alternatively, the PED holding system may facilitate communication between the PED and other components of the ride system. In some such cases, the passenger may be able to use the PED to control show effects, such as light effects on the ride vehicle or in an environment surrounding the ride vehicle during the ride cycle, for example. Thus, present embodiments advantageously hold the PED during the ride cycle (e.g., block the PED from falling off of the ride vehicle) and may also enable the passenger to charge the PED during the ride cycle and/or to use the PED to customize their experience on the ride vehicle.

FIG. 1 is a perspective view of a ride system 10 that may be used in an amusement park. The ride system 10 may include a ride vehicle 12, which may travel along a ride path 14 (e.g., track). The ride vehicle 12 may pass one or more show effects 16 (e.g., show elements, such as lights or animated figures) as the ride vehicle 12 travels along the ride path 14. The ride vehicle 12 may include one or more seats 18 and/or one or more passenger restraints 20 (e.g., lap bars, seat belts) that are arranged to hold one or more passengers on the ride vehicle 12.

The ride vehicle 12 may also include one or more PED holding devices 22 (e.g., containers, compartments, enclosures, recesses, cables, ties) that may be part of a PED holding system 24. For example, as shown, one PED holding device 22 may be provided for each seat 18. In the illustrated embodiment, the PED holding devices 22 for the seats 18 in a front row of the seats 18 are positioned in or on a front dashboard of the ride vehicle 12, while the PED holding devices 22 for the seats 18 in other rows of the seats 18 are positioned in or on the seats 18 (e.g., a rear surface of the seats 18) in an adjacent row of the seats 18. However, it should be appreciated that the PED holding devices 22 may be positioned at any suitable location on the ride vehicle 12 (e.g., in or on the seats 18, in or on the passenger restraints 20, in or on a bottom surface or floor of the ride vehicle 12, in or on a side surface of the ride vehicle 12, in or on an interior-facing surface or an exterior-facing surface of the ride vehicle 12).

It should also be appreciated that more than one ride vehicle 12 may travel along the ride path 14. Additionally, it should be appreciated that the ride vehicle 12 may not travel along the ride path 14, but instead, the ride vehicle 12 may be stationary or may move (e.g., tip, spin, raise, lower) without traversing the ride path 14 (e.g., without moving forward or rearward along the ride path 14). Furthermore, the ride vehicle 12 may have any suitable number of seats 18 (e.g., 1, 2, 3, 4, 5, 10, 15, 20, or more seats) arranged in any suitable configuration.

Figure 2:
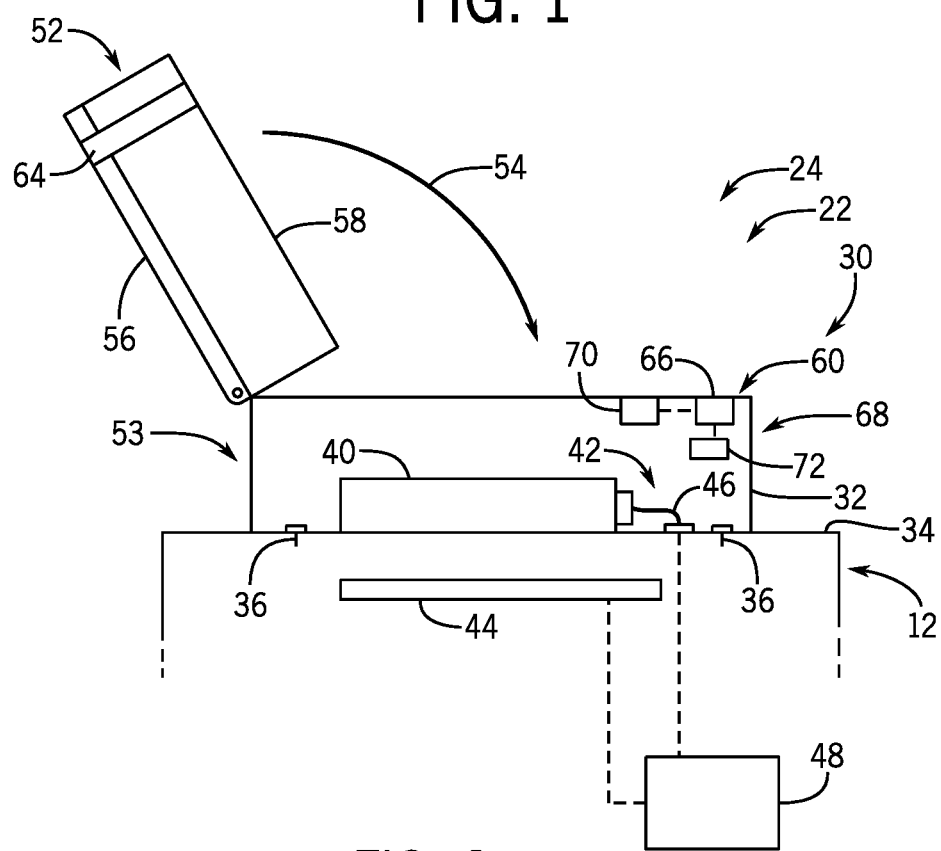
FIG. 2 is a cross-sectional side view of a personal electronic device (PED) holding system that may be used in the ride system of FIG. 1, wherein the PED holding system includes a charging system, in accordance with an embodiment of the present disclosure.

The PED holding device 22 may have any of a variety of forms that enable the PED holding device 22 to hold the PED of the passenger. FIGS. 2-5 depict various embodiments of the PED holding device 22 to facilitate discussion; however, these embodiments are not intended to be limiting and features of the illustrated embodiments may be combined in any of a variety of ways. With this in mind, FIG. 2 illustrates a cross-sectional side view of an embodiment of the PED holding device 22 that is part of the PED holding system 24. As shown, the PED holding device 22 includes a container 30 defined by a plurality of walls 32. The container 30 may be coupled to the ride vehicle 12 (e.g., to a frame or surface 34 of the ride vehicle 12 via one or more fasteners 36, such as bolts or welds) or the container 30 may be integrally formed with the surface 34 of the ride vehicle 12 (e.g., one-piece construction). The container 30 may extend outwardly from the surface 34 of the ride vehicle 12, as shown, or the container 30 may be recessed so that the container 30 is partially or fully recessed relative to the surface 34 of the ride vehicle 12. For example, the container 30 may merely be a recess or opening formed in the surface 34 of the ride vehicle 12 that is sized to receive a PED 40 from the passenger.

The PED 40 may be a device that is carried with the passenger onto the ride vehicle 12 and off of the ride vehicle 12. In some cases, the PED 40 is a device that the passenger brings into the amusement park, carries about the amusement park to different ride attractions, and/or takes home from the amusement park. The PED 40 may be owned by the passenger or otherwise under the control (e.g., rented or borrowed for a period of time) of the passenger. The PED 40 may be a mobile phone, a tablet, a watch, a camera, a laptop computer, an e-reader, an MP3 player, a toy, a rechargeable battery, or any other portable electronic and/or chargeable device.

The container 30 may be associated with at least one charging system, such as a wired charging system 42 and/or a wireless charging system 44, which is configured to charge the PED 40 while the PED 40 is within the container 30. For example, in operation, the passenger may place the PED 40 within the container 30 and then manually move a cable 46 of the wired charging system 42 to couple a connector (e.g., male connector) at one end of the cable 46 to a corresponding connector (e.g., female connector) of the PED 40 to enable the wired charging system 42 to charge an energy storage component (e.g., battery) of the PED 40 (e.g., using power from a power source 48). It should be appreciated that instead of the cable 46, the wired charging system 42 may include a docking station with a connector that is in a fixed position relative to the container 30. In such cases, the passenger may place the PED 40 relative to the docking station to couple the connector to the corresponding connector of the PED 40 to enable the wired charging system 42 to charge the energy storage component of the PED 40. The cable 46 may be a Universal Serial Bus (USB) cable, although the wired charging system 42 may include any other suitable type of cable or connector that is configured to charge the PED 40 upon physical connection to or engagement with the corresponding connector of the PED 40. In embodiments having the wireless charging system 44, the wireless charging system 44 may include a transmitter that is positioned proximate to or within the container 30, and the transmitter may interact with a receiver of the PED 40 to charge the PED 40 via any suitable wireless charging technique, such as an inductive charging technique and/or a radio-frequency charging technique.

In some embodiments, the ride vehicle 12 may be stationary, move slowly in place, or slowly traverse the ride path 14. In some such cases, the configuration of the container 30 and/or the connection between the PED 40 and the cable 46 may be sufficient to maintain the PED 40 within the container 30 and to hold the PED 40 on the ride vehicle 12 during the ride cycle. In some such cases, the PED 40 may remain generally stationary within the container 30 or otherwise remain in a position within the container 30 that enables the wireless charging system 44 to charge the PED 40 during the ride cycle.

However, it may be desirable to further secure the PED 40 within the container 30. For example, a cover 52 (e.g., lid, brace, net, strap) may be positioned over the PED 40 during the ride cycle. The cover 52 may have any of a variety of configurations. In the illustrated embodiment, the cover 52 includes a hinged lid that pivots relative to a base 53 of the container 30 from an open configuration (e.g., open position; open condition) to a closed configuration (e.g., closed position; closed condition), as shown by arrow 54, to enclose the PED 40 within the container 30. The cover 52 may be adjusted to the closed configuration manually by the passenger and/or by an operator, or the cover 52 may be adjusted to the closed configuration via an actuator that is electronically controlled by an electronic controller (e.g., prior to the ride cycle). The cover 52 may include a rigid element 56 (e.g., hard plastic or metal) and/or a compressible element 58 (e.g., foam). The rigid element 56 may protect the PED 40 within the container 30 and provide support to the compressible element 58. When the cover 52 is in the closed configuration, the compressible element 58 may contact and compress against the PED 40 to block movement of the PED 40, thereby facilitating charging of the PED 40 and/or blocking relative movement between the PED 40 and the ride vehicle 12 during the ride cycle. Thus, the container 30 may protect the PED 40, such as by blocking relative movement between the PED 40 and the ride vehicle 12 and/or by surrounding the PED 40 with the plurality of walls 32 (e.g., by isolating the PED 40 from the environment surrounding the ride vehicle 12). In some embodiments, the container 30 may be waterproof (e.g., the container 30 may block entry of water into an interior of the container 30). The container 30 may accommodate different size PEDs 40 and/or may be adjustable to accommodate different size PEDs 40 (e.g., the walls 32 may be adjustable).

In some embodiments, the PED holding device 22 may include a lock 60. The lock 60 may have any of a variety of configurations and generally move between an unlocked configuration (e.g., unlocked position; unlocked condition) to enable access to the PED 40 held by the PED holding device 22 and a locked configuration (e.g., locked position; locked condition) to block access to the PED 40 held by the PED holding device 22. As discussed in more detail below, the lock 60 may be in the locked configuration during the ride cycle. In the illustrated embodiment, the lock 60 is configured to lock the cover 52 to the base 53 of the container 30, and the lock 60 includes two locking elements 64, 66 that engage one another to hold the cover 52 in the closed configuration. The locking elements 64, 66 may be any suitable type of locking mechanism (e.g., magnetic lock; mechanical fastener, such as a latch; electronically-activated lock).

In some embodiments, the lock 60 may be manually adjusted by the passenger and/or the operator at any time before, during, and after the ride cycle to enable access to the PED 40 at any time, including during the ride cycle. However, in other embodiments, the lock 60 may be an electronically-activated lock that is maintained in the locked configuration during the ride cycle, thereby blocking the passenger from accessing the PED 40 held by the container 30 during the ride cycle. For example, in the illustrated embodiment, while the lock 60 is in the locked configuration, the passenger cannot open the container 30 and cannot remove the PED 40 from the container 30.

If the lock 60 is electronically-activated, the lock 60 may be part of a lock system 68 (e.g., radio-frequency identification [RFID] lock system) that includes a receiver 70 that receives an activation signal and a deactivation signal from a transceiver (e.g., on the ride vehicle 12 or in an environment surrounding the ride vehicle 12). In operation, upon receipt of the activation signal at the receiver 70 (e.g., prior to the ride cycle), the lock 60 may transition from the unlocked configuration to the locked configuration. The lock 60 may be held or maintained in the locked configuration until receipt of the deactivation signal at the receiver. Then, upon receipt of the deactivation signal at the receiver 70 (e.g., after the ride cycle), the lock 60 may transition from the locked configuration to the unlocked configuration.

In some embodiments, the charging system(s) 42, 44 and the lock system 68 may work together to incentivize the passenger to lock the PED 40 within the container 30, thereby reducing incidents in which the PED 40 falls off of the ride vehicle 12. For example, the charging system(s) 42, 44 may only charge the energy storage device of the PED 40 while the lock 60 is in the locked configuration. In such cases, the locking system 68 may provide feedback indicative of the configuration of the lock 60 (e.g., via a sensor 72 that detects whether the lock 60 is in the locked configuration or the unlocked configuration) to an electronic controller (e.g., having a processor and a memory) associated with the PED holding system 24. Upon receipt of feedback that indicates that the lock 60 is in the locked configuration, the electronic controller may instruct delivery of power from the power source 48 through the charging system(s) 42, 44 to charge the energy storage component of the PED 40. Other variations of this technique are envisioned. For example, in embodiments that are devoid of the lock 60, the charging system(s) 42, 44 may only charge the energy storage device of the PED 40 while the cover 52 is in the closed configuration (e.g., as detected by a sensor) and/or while the PED 40 is detected (e.g., as detected by a sensor) as being positioned fully and/or properly within the container 30. Thus, a passenger who connects the PED 40 to the cable 46 of the wired charging system 42, but who continues to hold and/or manipulate the PED 40 in an unintended manner during the ride cycle, will not enjoy the benefit of having their PED 40 charged during the ride cycle. As discussed in more detail below, additionally or alternatively, the access to and/or functionality of various other features (e.g., camera and/or audio features of the PED 40; camera and/or audio features in the environment surrounding the ride vehicle 12) may be based on the configuration of the cover 52 and/or the position of the PED 40 within the container 30. Thus, the PED holding system 24 may incentivize the passenger to lock the PED 40 within the container 30 in any of a variety of ways.

Figure 3:
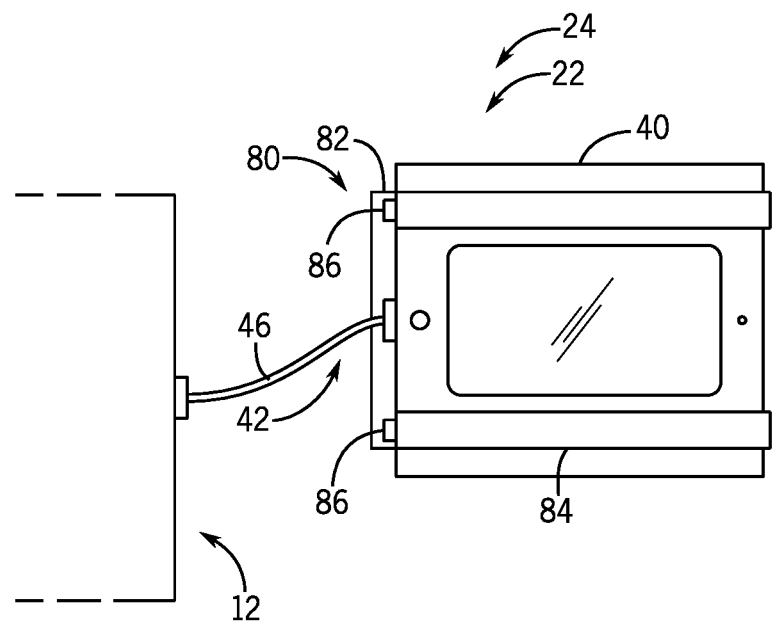
FIG. 3 is a front view of a PED holding system that may be used in the ride system of FIG. 1, wherein the PED holding system includes a tie assembly configured to couple a PED of a passenger to a cable of a charging system, in accordance with an embodiment of the present disclosure.

FIG. 3 is a front view of an embodiment of the PED holding system 24 that may be used in the ride vehicle 12. As shown, the PED holding system 24 includes the PED holding device 22 having a tie assembly 80 (e.g., strap, net, tether) configured to couple the PED 40 to the cable 46 of the wired charging system 42. As noted above, in some cases, the configuration of the container 30 and/or the connection between the PED 40 and the cable 46 may be sufficient to hold the PED 40 on the ride vehicle 12 during the ride cycle. However, it may be desirable to have another connection between the PED 40 and the cable 46 via the tie assembly 80 (e.g., in addition to the connection between the connector of the cable 46 and the corresponding connector of the PED 40) to facilitate charging and/or to further secure the PED 40 to the ride vehicle 12 during the ride cycle.

In the illustrated embodiment, the tie assembly 80 includes a cable portion 82 that is coupled to and contacts the cable 46 (and/or the connector at the end of the cable 46), and two PED portions 84 that extend from the cable portion 82 to wrap around the PED 40. The cable portion 82 may be relatively rigid, while the PED portions 84 may be relatively flexible (e.g., compared to the cable portion 82). The PED portions 84 may each include a first end coupled to the cable portion 82 and a second end coupled to the cable portion 82 (or to the first end of the respective PED portion 84). For example, the first end may be fixed or rigidly secured to the cable portion 82, while the second end may be removably coupled to the cable portion 82 via a fastener 86 (e.g., a snap, a buckle, a hook-and-loop interface). In operation, the passenger may manually move the cable 46 to connect the connector of the cable 46 to the corresponding connector of the PED 40. The passenger may then wrap the PED portions 84 around the PED 40 and couple the respective second end of each of the PED portions 84 to the cable portion 82. The passenger may adjust (e.g., tighten) the PED portions 84 so that the cable portion 82 and the PED portions 84 generally drive the cable 46 and the PED 40 toward one another to facilitate charging the PED 40 during the ride cycle and/or to secure the PED 40 to the ride vehicle 12, even during portions of the ride cycle in which the ride vehicle 12 moves quickly, turns, flips, or the like. The PED portions 84 may therefore also accommodate different size PEDs 40 (e.g., one passenger may use the tie assembly 80 to hold their PED 40 having a first size, and another passenger may use the tie assembly 80 to hold their PED 40 having a second size that is different than the first size). In some embodiments, the fasteners 86 may be and/or may operate as the locks 60 of FIG. 2, and thus, may be electronically-activated to block separation of the PED 40 from the cable 46 and from the ride vehicle 12 during the ride cycle. In such cases, the wired charging system 42 and the locks 60 may work together so that the wired charging system 42 only charges the energy storage device of the PED 40 while the locks 60 are in the locked configuration. Furthermore, the tie assembly 80 may be positioned relative to the PED 40 to enable the passenger to view at least some portion of the PED 40 (e.g., a display screen) and/or to access at least some features of the PED 40 (e.g., camera features and/or audio features of the PED 40) during the ride cycle.

The tie assembly 80 may have any of a variety of configurations, but may generally be coupled to and contact both the cable 46 and the PED 40. For example, the tie assembly 80 may include any number of cable portions 82 and PED portions 84. In some embodiments, the tie assembly 80 may be a net that extends from the cable 46 to wrap around the PED 40 to block movement of the cable 46 relative to the PED 40. It should be appreciated that the tie assembly 80 may also include elastic portions (e.g., the PED portions 84) that may be stretched to wrap around the PED 40 to block relative movement between the cable 46 and the PED 40. It should also be appreciated that the tie assembly 80 may be used in conjunction with a container, such as the container 30 of FIG. 2. For example, the container 30 may hold the PED 40, and the tie assembly 80 may be used to enhance the connection between the cable 46 and the PED 40. Furthermore, it should be appreciated that the tie assembly 80 may be configured to couple a component of the wireless charging system 44 (FIG. 2) to the PED 40, such as by wrapping around the component and the PED 40.

Figure 4:
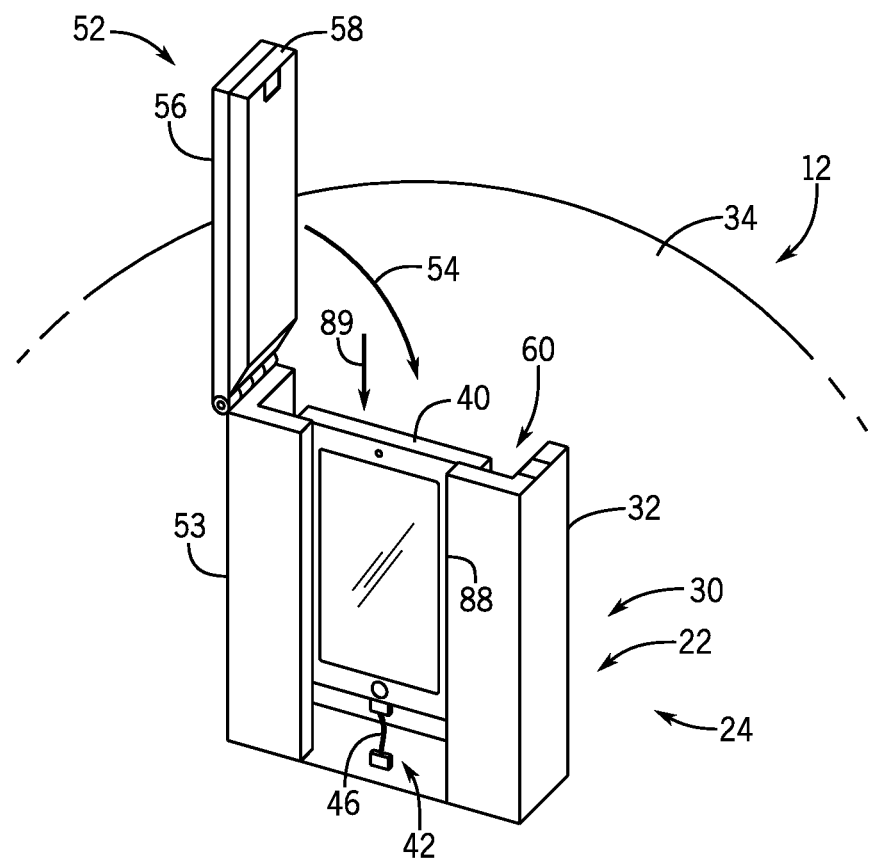
FIG. 4 is a perspective view of a PED holding system that may be used in the ride system of FIG. 1, wherein the PED holding system includes an opening to enable a passenger to view and/or access features of the PED, in accordance with an embodiment of the present disclosure.

FIG. 4 is a perspective view of an embodiment of the PED holding system 24 that may be used in the ride vehicle 12. As shown, the PED holding device 22 includes the container 30, which includes an opening 88 that enables the passenger to view at least a portion of the PED 40 (e.g., a display screen) and/or to access at least some features of the PED 40 (e.g., camera features and/or audio features of the PED 40). In some embodiments, the opening 88 may be an open space between the walls 32 of the container 30, and the opening 88 may enable the passenger to touch the PED 40 while the PED 40 is within the container 30. However, in some embodiments, the opening 88 may be a window (e.g., transparent component), which may be positioned between the walls 32 (e.g. opaque walls) of the container 30 to overlay the PED 40 while the PED 40 is within the container 30. In such cases, the passenger may not be able to touch the PED 40 while the PED 40 is within the container 30, but the passenger may still be able to view at least a portion of the PED 40 and/or access at least some features of the PED 40 via the opening 88 (e.g., a lens of a camera of the PED 40 may be able to obtain images through the opening 88). It should also be appreciated that the opening 88 may have any of a variety of configurations, including any of a variety of sizes and locations.

The walls 32 of the container 30 may extend outwardly from the surface 34 of the ride vehicle 12 (e.g., toward the passenger) and/or may bend inwardly (e.g., toward one another). Accordingly, the PED 40 may be blocked from moving laterally (e.g., side-to-side) relative to the container 30 and longitudinally (e.g., forward-and-back) relative to the container 30 by the walls 32. The PED 40 may also be supported by and rest on one of the walls 32 that forms a bottom of the container 30, as shown. In some embodiments, the container 30 may be associated with at least one charging system, such as the wired charging system 42 and/or the wireless charging system 44 (FIG. 2), that is configured to charge the PED 40 while the PED 40 is within the container 30. The container 30 may accommodate different size PEDs 40 and/or may be adjustable to accommodate different size PEDs 40 (e.g., the walls 32 may be adjustable).

In some embodiments, the ride vehicle 12 may be stationary, move slowly in place, or slowly traverse the ride path 14. In some such cases, the configuration of the container 30 and/or the connection between the PED 40 and the cable 46 may be sufficient to maintain the PED 40 within the container 30 and to hold the PED 40 on the ride vehicle 12 during the ride cycle. In some such cases, the PED 40 may remain generally stationary within the container 30 or otherwise remain in a position within the container 30 that enables the wireless charging system 44 to charge the PED 40 during the ride cycle.

However, in some embodiments, it may be desirable to further secure the PED 40 within the container 30 using the cover 52, for example. Similar to the cover 52 of FIG. 2, the cover 52 of FIG. 4 includes a hinged lid that pivots relative to the base 53 of the container 30 from the open configuration to the closed configuration, as shown by the arrow 54, to enclose the PED 40 within the container 30. The cover 52 may be adjusted to the closed configuration manually by the passenger and/or by the operator, or the cover 52 may be adjusted to the closed configuration via the actuator that is electronically controlled by the electronic controller (e.g., prior to the ride cycle). The cover 52 may include the rigid element 56 and/or the compressible element 58. When the cover 52 is in the closed configuration, the compressible element 58 may contact and compress against the PED 40 to block vertical movement (e.g., up-and-down) of the PED 40 relative to the container 30, thereby facilitating charging of the PED 40 and/or further securing the PED 40 to the ride vehicle 12. Blocking movement of the PED 40 relative to the container 30 (and therefore, relative to the ride vehicle 12) may also facilitate viewing images (including streaming video) on the screen of the PED 40 and/or use of certain features of the PED 40 (e.g., the camera of the PED 40).

It should be appreciated that the container 30 may include additional compressible elements that contact and compress against other surfaces of the PED 40 to assist in blocking vertical, lateral, and/or longitudinal movement of the PED 40 relative to the container 30. The container 30 may also include the lock 60 of FIG. 2, and the lock 60 may be electronically-activated to block separation of the cover 52 from the base 53 and to block separation of the PED 40 from the cable 46 and from the ride vehicle 12 during the ride cycle. In such cases, the charging system(s) 42, 44 and the lock 60 may work together so that the charging system(s) 42, 44 only charge the energy storage device of the PED 40 while the lock 60 is in the locked configuration.

In operation, the passenger may position the PED 40 within the container 30, such as by lowering the PED 40 into the container 30 in the direction of arrow 89. The passenger (or the operator) may manually couple the connector of the cable 46 to the corresponding connector of the PED 40 or may otherwise couple the PED 40 to the wired charging system 42 or the wireless charging system 44 (FIG. 2). The passenger (or the operator) may close the cover 52 and may lock the cover 52 to the base 53 of the container 30 via the lock 60. However, in some embodiments, the cover 52 may be adjusted to the closed configuration and/or the lock 60 may be adjusted to the locked configuration via instructions from the electronic controller. The cover 52 and the lock 60 may remain in these configurations during the ride cycle.

Even while the PED 40 is held and/or locked within the container 30, the passenger may view at least a portion of the PED 40 and/or may access at least some features of the PED 40 via the opening 88. For example, the passenger may view the screen of the PED 40 so that the passenger can view pop-up notifications (e.g., text messages or social media messages), view images displayed on the display screen (e.g., images obtained by the camera of the PED 40), view information related to an audio track that is currently playing (e.g., via speakers of the PED 40), and/or any other information that might be desirable to display on the screen of the PED 40. The passenger may be able to touch the PED 40 to interact with the PED 40, such as to type and send text messages, to operate the camera of the PED 40, to select an audio track to play during the ride cycle, and/or to carry out any of a variety of other operations using the PED 40. For example, the passenger may operate the camera of the PED 40 to take photos and/or to record video of themselves as the ride vehicle 12 travels along the ride path 14. The photos and/or the video may be stored locally on the PED 40 and/or the video may be streamed (e.g., livestreamed) via a network (e.g., cellular or other wireless network), for example.

In some embodiments, certain features of the PED 40 and/or uses of the PED 40 (e.g., camera features and/or audio features) may only be available to the passenger while the lock 60 is in the locked configuration. For example, the passenger may be incentivized to run a software application on the PED 40 during the ride cycle (e.g., due to various features of the software application, such as features that enable the passenger to play a game during the ride cycle or to view otherwise unavailable information or media on the screen of the PED 40 during the ride cycle), and the application may only enable use of the camera of the PED 40 and/or access to audio tracks while the lock 60 is in the locked configuration. In some cases, the software application may only make certain of its features (e.g., game features, media) available on the PED 40 while the lock 60 is in the locked configuration. The features of the PED 40 (e.g., camera features and/or audio features) may activate automatically while the lock 60 is in the locked configuration (e.g., without passenger input). For example, the software application on the PED 40 may enable the PED 40 to take photos and/or record video automatically (e.g., during the ride cycle and/or at certain parts of the ride cycle) while the lock 60 is in the locked configuration.

Figure 5:
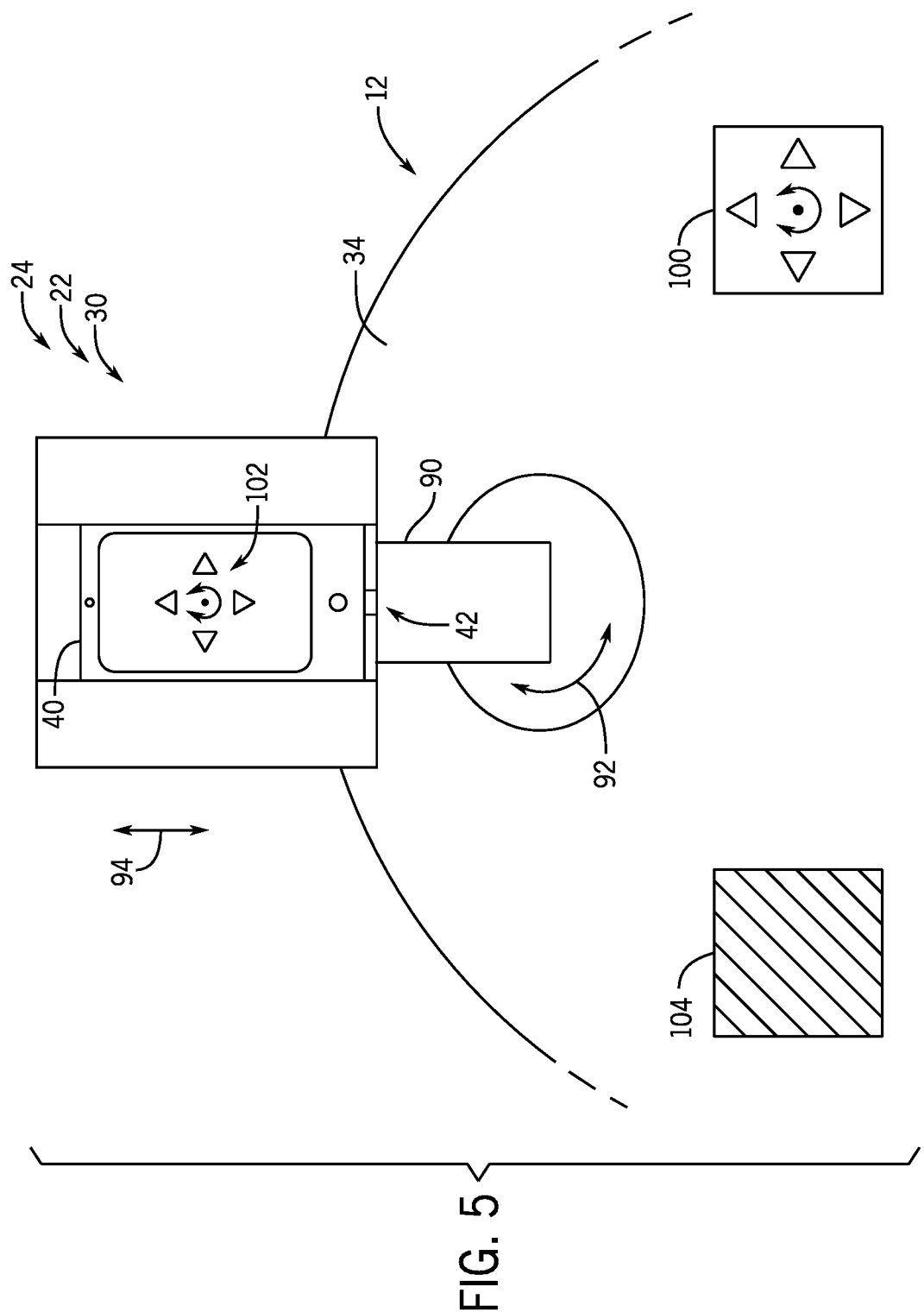
FIG. 5 is a front view of a PED holding system that may be used in the ride system of FIG. 1, wherein the PED holding system includes an adjustable arm, in accordance with an embodiment of the present disclosure.

It may be desirable for the PED holding device 22 to be adjustable to enable multiple different viewing directions for the camera function of the PED 40. Accordingly, FIG. 5 is a front view of an embodiment of the PED holding system 24 that may be used in the ride system of FIG. 1, wherein the PED holding device 22 is adjustable to enable the multiple different viewing directions for the camera function of the PED 40. The PED holding device 22 may have any of a variety of configurations, but may include the container 30 similar to the container 30 of FIG. 4 and that is mounted on an adjustable arm 90 (e.g., rotatable arm, flexible arm, telescoping arm). The container 30 may accommodate different size PEDs 40 and/or may be adjustable to accommodate different size PEDs 40. The adjustable arm 90 may be mounted to or supported on the surface 34 of the ride vehicle 12. The adjustable arm 90 may have any number of degrees of freedom to change the camera position and/or angle relative to the ride vehicle 12, but in some embodiments, the adjustable arm 90 may at least rotate, as shown by arrows 92. The adjustable arm 90 may additionally or alternatively move vertically, as shown by arrows 94. The adjustable arm 90 may additionally or alternatively move longitudinally (e.g., front-to-back; toward and away from the passenger) and/or laterally (e.g., side-to-side). Such movements may enable the camera of the PED 40 to capture images of the passenger, adjacent passengers, and/or the environment surrounding the ride vehicle 12. For example, the passenger may desire to orient the PED 40 to capture images (e.g., video images) forward of the ride vehicle 12 as the ride vehicle 12 climbs up a hill of the ride path 14, and the passenger may desire to orient the PED 40 to capture images of the passenger as the ride vehicle 12 drops down the hill of the ride path 14.

In some embodiments, the passenger may manually adjust the adjustable arm 90 by contacting and exerting a force on the adjustable arm 90. Additionally or alternatively, the passenger may adjust the adjustable arm 90 using an input device 100 (e.g., touchscreen, control pad, joystick) of the ride vehicle 12. As discussed in more detail below, the PED 40 may be communicatively coupled to the ride vehicle 12 and/or the ride system 10 (e.g., via the wired charging system 42, the wireless charging system 44, or some other suitable wired or wireless communication system). Accordingly, in some embodiments, the passenger may adjust the adjustable arm 90 using the PED 40. For example, the passenger may view a virtual control pad 102 on the screen of the PED 40, and touching the virtual control pad 102 may cause movement of the adjustable arm 90.

In some embodiments, the movement of the adjustable arm 90 may be pre-programmed prior to the ride cycle. For example, the adjustable arm 90 may be configured to move between a first position to orient the PED 40 (e.g., at a first camera position and/or angle) to capture images forward of the ride vehicle 12 during some portions of the ride cycle and to orient the PED 40 (e.g., a second camera position and/or angle) to capture images of the passenger during other portions of the ride cycle. In this way, the PED holding system 24 facilitates generation of more interesting and entertaining images without any input from the passenger during the ride cycle (e.g., without the passenger touching the PED 40 during the ride cycle). Thus, the images may also be of better quality, as the images may not show the passenger moving their hands to touch the PED 40 or to adjust the adjustable arm 90. The movement of the adjustable arm 90 may be pre-programmed, such that the adjustable arm 90 moves in the same way during each ride cycle, or multiple different sequences of movement may be pre-programmed such that the adjustable arm 90 moves in different ways during different ride cycles. Thus, the passenger may obtain different images each time the passenger experiences the ride. In some embodiments, the passenger may be able to select one of multiple different sequences of movement or otherwise provide inputs related to preferences for the movement of the adjustable arm 90 prior to the ride (e.g., via the PED 40 at any time prior to the ride), at a kiosk prior to or in the queue for the ride, and/or via the input device 100 of the ride vehicle 12. For example, the passenger may provide an input to limit movement of the adjustable arm 90 so that the camera of the PED 40 does not obtain images of seats to one side of the passenger (e.g., other passengers who are not traveling with the passenger) and/or to cause movement of the adjustable arm 90 so that the camera of the PED 40 obtains images of seats to the other side of the passenger (e.g., other passengers who are traveling with the passenger).

It should be appreciated that the container 30 of FIG. 5 may be used with the cover 52 and/or the lock 60. In some such cases, the charging system(s) 42, 44 and the lock 60 may work together so that the charging system(s) 42, 44 only charges the energy storage device of the PED 40 while the lock 60 is in the locked configuration. Furthermore, certain features of the PED 40 and/or uses of the PED 40 may only be available to the passenger while the lock 60 is in the locked configuration. Additionally or alternatively, the adjustable arm 90 may only be movable while the lock 60 is in the locked configuration.

The PED holding device 22 may also enable the passenger to access the PED 40 to select and/or to play an audio track during the ride cycle. The audio track may be played via a speaker of the PED 40. As discussed in more detail below, the PED 40 may be communicatively coupled to the ride vehicle 12 and/or the ride system 10 (e.g., via the wired charging system 42, the wireless charging system 44, or some other suitable wired or wireless communication system). Accordingly, in some embodiments, the audio track selected by the passenger using the PED 40 may be played via a speaker 104 of the ride vehicle 12 and/or via a speaker in the environment surrounding the ride vehicle 12. Furthermore, the audio track may be selected from audio tracks stored in a storage device of the PED 40, from audio tracks stored in a remote storage device and that can be streamed via a wireless network, and/or from audio tracks stored in a ride storage device of the ride system 10 (e.g., on the ride vehicle 12). Due to the communication between the PED 40 and the ride system 10, the audio tracks stored in the ride storage device may be displayed on the screen of the PED 40. In this way, the passenger may customize their experience during the ride on the ride vehicle 12. In some embodiments, certain audio features (e.g., the ability to view audio tracks stored in a ride storage device of the ride system 10 and/or the ability to play audio tracks selected via the PED 40 on the speaker 104 of the ride vehicle and/or a speaker in the environment surrounding the ride vehicle 12) may only be available to the passenger while the lock 60 is in the locked configuration.

Figure 6:
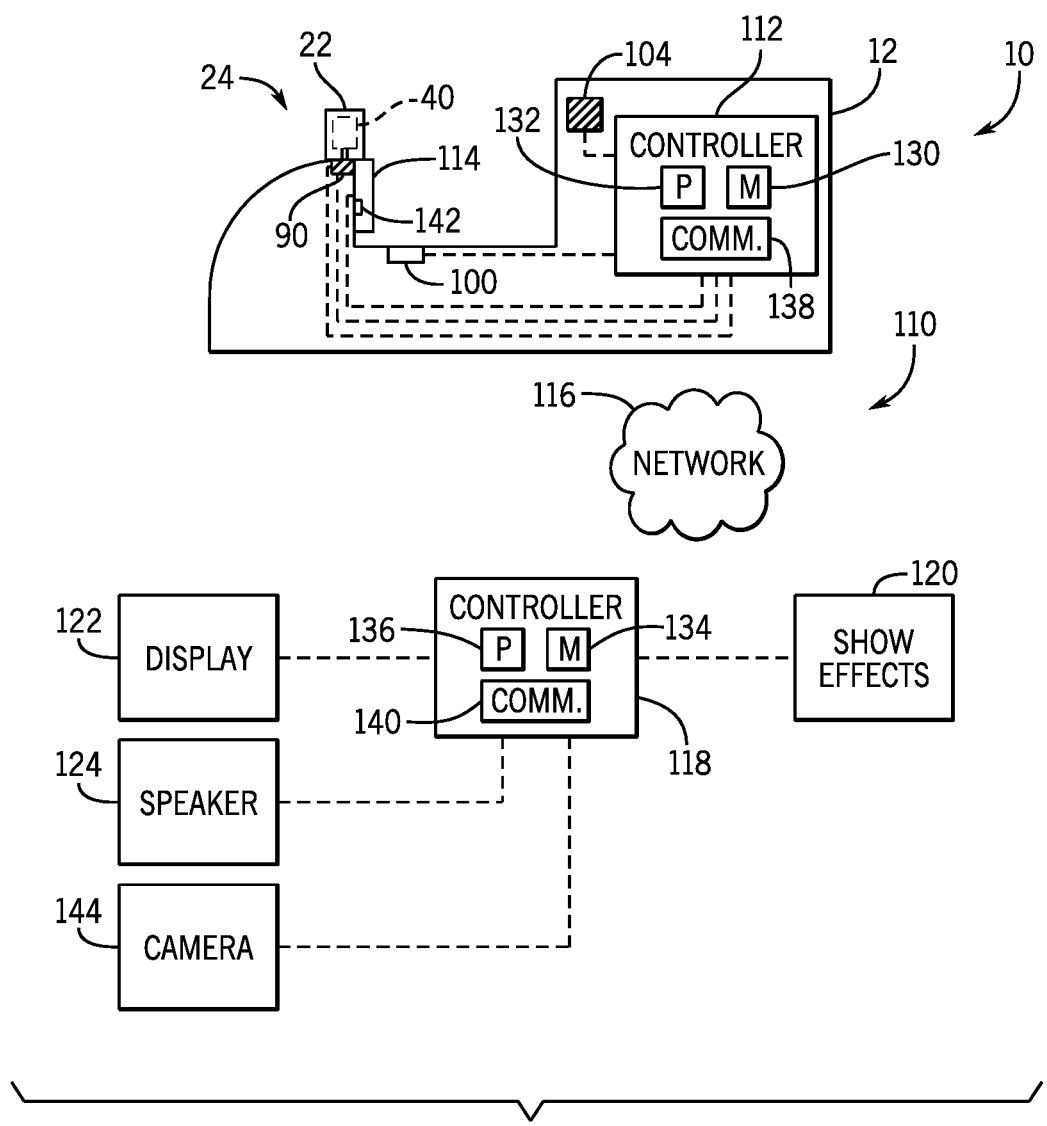
FIG. 6 is a schematic diagram of the ride system of FIG. 1 having a ride control system that enables communication between a PED of a passenger and other components of the ride system, in accordance with an embodiment of the present disclosure.

As noted above, the PED 40 may communicate with the ride system 10. In some cases, the PED holding system 24 may facilitate these communications between the PED 40 and the ride system 10 (e.g., via the wired charging system 42 or the wireless charging system 44) and/or may position the PED 40 to facilitate use of the PED 40 by the passenger during the ride cycle. With the foregoing in mind, FIG. 6 is a schematic diagram of the ride system 10 having a ride control system 110 that enables communication between the PED 40 of the passenger and other components of the ride system 10.

As shown, the PED holding device 22 holds the PED 40 on the ride vehicle 12. The PED 40 may be communicatively coupled (e.g., via the wired charging system 42, the wireless charging system 44, or via some other wired or wireless communication system) to a ride vehicle controller 112 (e.g., electronic controller) that is located on the ride vehicle 12. The ride vehicle 12 may additionally or alternatively include the input device 100, the speaker 104, and/or a display screen 114 (e.g., touchscreen). In some embodiments, some or all of these components on the ride vehicle 12 may mirror the PED 40 or effectively replace/act as components of the PED 40 during the ride cycle. For example, the display screen 114 may be positioned adjacent to or on the container 30 (e.g., on the cover 52 of the container 30). In response to the lock 60 being in the locked configuration or at some other time, the display screen 114 may mirror the screen of the PED 40 so that the display screen 114 appears to be the screen of the PED 40. Alternatively, icons, images (e.g., stored on the PED 40), audio tracks (e.g., stored on the PED 40), and the like that might otherwise be displayed on the screen of the PED 40 may be displayed on the display screen 114. The passenger may then interact with the display screen 114 during the ride cycle, such as to select audio tracks to be played via the speaker 104 or to carry out any of the other techniques disclosed herein, for example. Advantageously, this may make the passenger feel like he or she is interacting with their own PED 40 and may provide an interface that is comfortable or familiar to the passenger.

It should be appreciated that the ride vehicle controller 112 may carry out the various disclosed operations that are based on the configuration of the lock 60 (e.g., upon receipt of the feedback from the sensor 72 [FIG. 1], the ride vehicle controller 112 may instruct delivery of power from the power source 48 [FIG. 1] to charge the energy storage component of the PED 40). The ride vehicle controller 112 may also communicate (e.g., via a wireless network 116) with a ride environment controller 118 (e.g., electronic controller) that is configured to control various show effects 120 (e.g., show elements, such as lighting or animated figures; the one or more show effects 16 of FIG. 1) in the environment surrounding the ride vehicle 12 as the ride vehicle travels along the ride path 14. The ride environment controller 118 may also be configured to instruct display of information (e.g., images) on a ride display screen 122 and/or playback of audio via a ride speaker 124. The ride display screen 122 and/or the ride speaker 124 may be located in the environment surrounding the ride vehicle 12. For example, the ride display screen 122 may be located near an end of the ride path 14 or at an exit of the attraction (e.g., by the exit door) or in an operations room designated for use by the operator of the ride. As another example, the ride speaker 124 may be located in one section of the ride 12 along the ride path 14.

In operation, the PED 40 may work together with the components of the ride system 10 to enhance the passenger's experience. For example, the PED holding system 24 may enable the passenger to operate the camera of the PED 40 as the ride vehicle 12 travels along the ride path 14 or may enable the camera of the PED 40 to otherwise capture images as the ride vehicle 12 travels along the ride path 14. The passenger may view the images obtained by the camera of the PED 40 on the screen of the PED 40, on the display screen 114 of the ride vehicle 12, on the ride display screen 122, and/or on any other screens that are communicatively coupled to the ride system 10. For example, the PED 40 may capture an image of the passenger as the ride vehicle 12 drops down a hill of the ride path 14, and the image may be displayed on the display screen 114 of the ride vehicle 12 and/or on the ride display screen 122 at the exit of the ride to enable the passenger to view the image on a larger display screen (e.g., the ride display screen 122 versus the screen of the PED 40). In some embodiments, the PED 40 may capture an image of one of the show effects 120, and the image may be displayed on the ride display screen 122 in the operations room to enable the operator to see the show effect 120 (e.g., to see whether the show effect 120 is working properly or improperly).

In some embodiments, the PED holding system 24 may enable the passenger to interact with the PED 40 to select audio tracks for playback as the ride vehicle 12 travels along the ride path 14. The audio track may be played via the speaker of the PED 40, the speaker 104 of the ride vehicle 12, and/or via the ride speaker 124. Furthermore, the audio track may be selected from audio tracks stored in a storage device of the PED 40, from audio tracks stored in a remote storage device off of the ride vehicle 12 and that can be streamed via a wireless network (e.g., the network 116), and/or from audio tracks stored in a ride storage device on the ride vehicle 12. For example, due to the communication between the PED 40 and the ride system 10, the audio tracks stored in the ride storage device may be displayed on the screen of the PED 40 for selection by the passenger.

Various other functions may be enabled via the communication between the PED 40 and the ride system 10. For example, the PED holding system 24 may include the adjustable arm 90, and in such cases, the passenger may control the movement of the adjustable arm 90 via inputs at the PED 40, the input device 100, and/or the display screen 114, for example. Furthermore, the PED 40 may be used to display any information that is typically displayed on the display screen 114. Thus, in some cases, the PED 40 may function as the display screen 114 of the ride vehicle 12 (e.g., instead of the display screen 114) or may function as a duplicate display screen so that the passenger can view the information on both the screen of the PED 40 and the display screen 114 of the ride vehicle 12. The various displays and screens can be configured based on the user's preferences and/or available devices. For example, one passenger may not have a PED 40 and may view the information on the display screen 114 of the ride vehicle 12, another passenger may view the information on the display screen 114 that mirrors the screen of the PED 40, another passenger may view the information only on the screen of the PED 40, while another passenger may view the information on both the screen of the PED 40 and the display screen 114 of the ride vehicle 12.

The PED holding system 24 may also enable the passenger to interact with other features of the ride system 10 and/or to control the show effects 120 during the ride cycle (e.g., as the ride vehicle 12 travels along the ride path 14). For example, a software application on the PED 40 may enable the passenger to play a game (e.g., answer trivia questions) relevant to the ride system 10 during the ride cycle to enhance the experience. As another example, upon initiation of communication between the PED 40 and the ride environment controller 118 (e.g., via the ride vehicle controller 112 and/or via the network 116), a software application on the PED 40 may enable the passenger to provide inputs via the PED 40 to control the show effects 120. The passenger may provide an input to illuminate lights along the ride path 14, to activate an animated figure, or to otherwise alter the environment surrounding the ride vehicle 12 during the ride cycle (e.g., water effects, smoke effects, move walls). It should be appreciated that the ride system 10 may also enable the passenger to control effects on the ride vehicle 12 (e.g., lights on the ride vehicle 12), to control movements of the ride vehicle 12 (e.g., steering, speed), and/or to otherwise affect other aspects of the ride experience via inputs at the PED 40.

Due to communication between the PED 40 and the ride system 10, the ride system 10 may gather information about the passenger that may enable the ride system 10 to enhance the experience for the passenger. For example, the ride system 10 may obtain information about the passenger's preferred language from the PED 40 (e.g., from the settings on the PED 40), and the ride system 10 may then provide communication (e.g., text on the screen of the PED 40, the display screen 114, or the ride display screen 122) in the passenger's preferred language. It should be appreciated that the communication between the PED 40 and the ride system 10 and/or the associated functionality (e.g., selection of an audio track on the PED 40 to be played via the ride speaker 124, control of the show effects 120 using the PED 40), may only be available while the lock 60 is in the locked configuration.

As shown, the ride vehicle controller 112 may include a memory device 130 and a processor 132 that enable the ride vehicle controller 112 to control (e.g., via control signals) components of the ride vehicle 12, including the adjustable arm 90 of the PED holding system 24. The ride environment controller 118 may include a memory device 134 and a processor 136 that enable the ride environment controller 118 to control (e.g., via control signals) the show effects 120 and other components of the ride system 10. The ride vehicle controller 112 may include a communication component 138 and the ride environment controller 118 may also include a communication component 140. The communication components 138, 140 enable communication between the ride vehicle controller 112 and the ride environment controller 118 via the network 116. The communication components 138, 140 may additionally or alternatively enable communication with the PED 40 via the network 116 (e.g., the PED 40 may communicate wirelessly with the ride vehicle controller 112 and/or the ride environment controller 118). For example, the passenger may provide an input to instruct activation of one of the show effects 120 via the PED 40, and the input may be communicated wirelessly from the PED 40 to the ride environment controller 118 via the network 116.

One or more ride vehicle cameras 142 may be provided on the ride vehicle 12 (e.g., travel with the ride vehicle 12) and/or one or more ride cameras 144 may be provided in the environment surrounding the ride vehicle 12. Images obtained by the ride vehicle cameras 142 and/or the ride cameras 144 may be communicated to the PED 40 (e.g. via the wired charging system 42, the wireless charging system 44, or some other suitable wired or wireless communication system) and may be displayed on the screen of the PED 40. In some cases, certain functions associated the ride vehicle cameras 142 and/or the ride cameras 144 may be made available to the passenger in response to the PED 40 being locked within the container 30. For example, the ride vehicle cameras 142 and/or the ride cameras 144 may only obtain images of the passenger as the passenger experiences the ride while the PED 40 is locked within the container 30 and/or any images obtained by the ride vehicle cameras 142 and/or the ride cameras 144 may only be provided to the passenger (e.g., provided to the PED 40 for display on the PED 40) while the PED 40 is locked within the container 30. Other similar techniques to incentivize the passenger to lock the PED 40 within the container 30 are envisioned. For example, the passenger may be able to purchase or download any images obtained by the ride vehicle cameras 142 and/or the ride cameras 144 at a discount if the PED 40 was locked within the container 30 during the ride cycle.

The memory devices 130, 134 may include one or more tangible, non-transitory, computer-readable media that store instructions executable by the processors 132, 136 and/or data (e.g., thresholds) to be processed by the processors 132, 136. For example, the memory devices 130, 134 may include random access memory (RAM), read only memory (ROM), rewritable non-volatile memory such as flash memory, hard drives, optical discs, and/or the like. Additionally, the processors 132, 136 may include one or more general purpose microprocessors, one or more application specific processors (ASICs), one or more field programmable gate arrays (FPGAs), or any combination thereof. Further, the memory devices 130, 134 may store instructions executable by the processors 132, 136 to perform the methods and control actions described herein for the ride system 10.

It should be appreciated that the ride control system 110 illustrated in FIG. 6 is merely exemplary and that various other configurations may be utilized to carry out the techniques disclosed herein. Furthermore, the various functions described herein may be divided between the ride vehicle controller 112, the ride environment controller 118, and/or one or more other processing devices (e.g., a processor of the PED 40) in any suitable manner. Additionally, it should be appreciated that the various features and elements shown and described with reference to FIGS. 1-6 may be combined or exchanged with one another.

Figure 7:
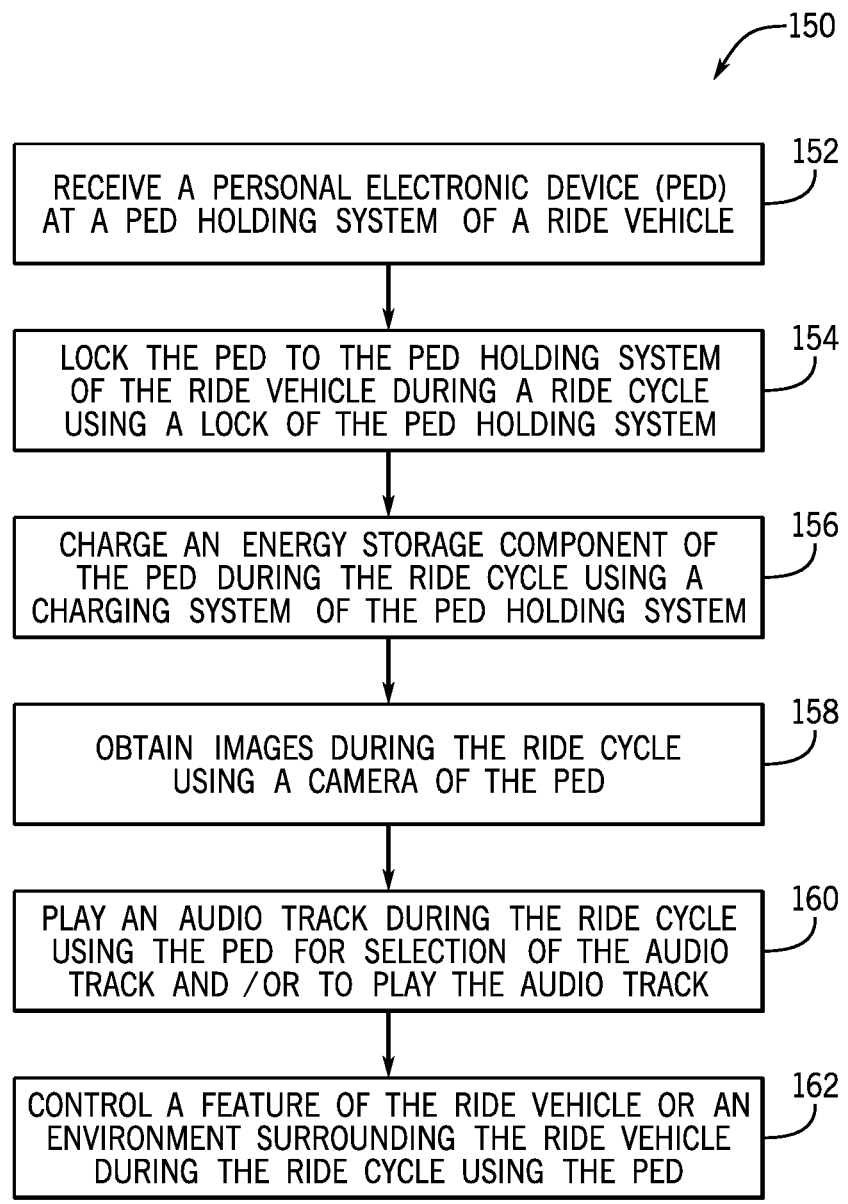
FIG. 7 is a flow diagram of a method of using a PED holding system in the ride system of FIG. 1, in accordance with an embodiment of the present disclosure.

FIG. 7 is a flow diagram of a method 150 of using the PED holding system 24 in the ride system 10. The method 150 disclosed herein includes various steps represented by blocks. It should be noted that at least some steps of the method 150 may be performed as an automated procedure by a system, such as the ride system 10. Although the flow chart illustrates the steps in a certain sequence, it should be understood that the steps may be performed in any suitable order and certain steps may be carried out simultaneously, where appropriate. Additionally, steps may be added to or omitted from the method 150. Further, certain steps or portions of the method 150 may be performed by separate devices. For example, a first portion of a method 150 may be performed by the processor 132 of the ride vehicle controller 112, while a second portion of the method 150 may be performed by the processor 136 of the ride environment controller 118.

In step 152, the method 150 may begin with the PED holding system 24 receiving or mating with the PED 40. For example, the passenger may place the PED 40 within the container 30 and/or may couple the PED 40 to the wired charging system 42. In step 154, the lock 60 of the PED holding system 24 may be adjusted from the unlocked configuration to the locked configuration to block access to the PED 40 and/or to block the PED 40 from separating from the ride vehicle 12 during the ride cycle. In step 156, the charging system(s) 42, 44 of the PED holding system 24 may charge an energy storage component of the PED 40. In some embodiments, the charging system(s) 42, 44 may charge the energy storage component of the PED 40 in response to the lock 60 being in the locked configuration.

In step 158, the camera of the PED 40 may be used to obtain images during the ride cycle. In some embodiments, the camera may be accessible to the passenger and/or operable in response to the lock 60 being in the locked configuration. In step 160, the PED 40 may be used to select and/or play an audio track during the ride cycle. In some embodiments, the selection and/or play functionality may be made available in response to the lock 60 being in the locked configuration. In step 162, the PED 40 may be used to control features of the ride vehicle 12 (e.g., the adjustable arm 90, movement of the ride vehicle 12) and/or features in the environment surrounding the ride vehicle 12 (e.g., the show effects 120). In some embodiments, the PED 40 may be made operable to control such features in response to the lock 60 being in the locked configuration.

While only certain features of present embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride system, comprising:
   a personal electronic device (PED) holding system for a ride vehicle, wherein the PED holding system comprises:
   a lock that is configured to move from an unlocked configuration to a locked configuration to lock a PED of a passenger of the ride vehicle to the ride vehicle during a ride cycle; and
   a charging system that is configured to charge an energy storage component of the PED during the ride cycle, wherein the PED holding system is configured to enable features of a software application on the PED in response to the PED being locked to the ride vehicle via the lock.

2. The ride system of claim 1, wherein the PED holding system comprises a container that is configured to contain the PED during the ride cycle.

3. The ride system of claim 2, wherein the PED holding system comprises a compressible material that is configured to contact the PED and to block movement of the PED relative to the container while the PED is contained within the container.

4. The ride system of claim 1, wherein the charging system is configured to charge the energy storage component of the PED in response to the PED being locked to the ride vehicle via the lock.

5. The ride system of claim 1, wherein the charging system comprises a wired charging system comprising a cable having a connector that is configured to connect to a corresponding connector of the PED.

6. The ride system of claim 1, wherein the charging system comprises a wireless charging system that is configured to wirelessly charge the energy storage component of the PED.

7. The ride system of claim 1, wherein the PED holding system comprises an adjustable arm that is configured to move to adjust a position of the PED relative to a frame of the ride vehicle during the ride cycle, and an electronic controller that is configured to control the adjustable arm to move to adjust the position of the PED relative to the frame of the ride vehicle during the ride cycle.

8. The ride system of claim 1, wherein the PED holding system is configured to enable use of a camera of the PED during the ride cycle.

9. The ride system of claim 1, wherein the PED holding system comprises an opening to enable the passenger to view a display screen of the PED while the PED is locked to the ride vehicle via the lock.

10. The ride system of claim 1, comprising a camera on the ride vehicle or in an environment surrounding the ride vehicle, wherein a function associated with the camera is made available to the passenger in response to the PED being locked to the ride vehicle via the lock.

11. The ride system of claim 1, comprising a ride vehicle display screen on the ride vehicle, wherein the ride vehicle display screen is configured to mirror a display screen of the PED while the PED is locked to the ride vehicle via the lock.

12. The ride system of claim 1, comprising a ride control system that is configured to communicatively couple to the PED, wherein the ride control system is configured to enable an input from the passenger at the PED to affect a show effect in an environment surrounding the ride vehicle during the ride cycle.

13. The ride system of claim 12, wherein the ride control system is configured to enable the input from the passenger at the PED to affect the show effect in response to the PED being locked to the ride vehicle via the lock.

14. A personal electronic device (PED) holding system for a ride vehicle, wherein the PED holding system comprises:
a container that is configured to contain a PED of a passenger of the ride vehicle during a ride cycle, wherein the container enables a ride controller of the ride vehicle to interface with a camera of the PED during the ride cycle;
a charging system that is configured to charge an energy storage component of the PED while the PED is contained within the container during the ride cycle; and
a lock that is configured to move from an unlocked configuration to a locked configuration to lock the PED within the container, wherein the PED holding system is configured to enable features of a software application in response to the PED being locked within the container via the lock.

15. The PED holding system of claim 14, wherein the charging system is configured to charge the energy storage component of the PED in response to the PED being locked within the container via the lock.

16. The PED holding system of claim 14, comprising an adjustable arm coupled to the container, wherein the adjustable arm is configured to move to adjust a position of the container and the PED relative to a frame of the ride vehicle during the ride cycle.

17. A method of operating a personal electronic device (PED) holding system during a ride cycle, wherein the method comprises:
charging an energy storage component of a PED during the ride cycle using a charging system of the PED holding system in response to the PED being locked to a ride vehicle via a lock of the PED holding system; and
enabling features of a software application on the PED in response to the PED being locked to the ride vehicle via the lock.

18. The method of claim 17, comprising enabling access to a camera of the PED during the ride cycle in response to the PED being locked to the ride vehicle via the lock.

19. The method of claim 17, comprising receiving an input via the PED and controlling a feature of the ride vehicle based on the input or controlling a feature of a show effect in an environment surrounding the ride vehicle based on the input, using an electronic controller.

* * * * *